US012734811B2

(12) United States Patent
Satake et al.

(10) Patent No.: US 12,734,811 B2
(45) Date of Patent: Sep. 15, 2026

(54) PRINTING APPARATUS

(71) Applicant: SEIKO EPSON CORPORATION, Tokyo (JP)

(72) Inventors: Akihiro Satake, Shiojiri (JP); Daisuke Nishizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 155 days.

(21) Appl. No.: 18/909,048

(22) Filed: Oct. 8, 2024

(65) Prior Publication Data

US 2025/0121599 A1 Apr. 17, 2025

(30) Foreign Application Priority Data

Oct. 12, 2023 (JP) ................................ 2023-176800

(51) Int. Cl.
*B41J 2/17* (2006.01)
*B41J 2/145* (2006.01)
*B41J 25/00* (2006.01)

(52) U.S. Cl.
CPC ............. *B41J 2/1714* (2013.01); *B41J 2/145* (2013.01); *B41J 25/001* (2013.01)

(58) Field of Classification Search
CPC ........ B41J 2/1714; B41J 2/145; B41J 25/001; B41J 2/16532
See application file for complete search history.

(56) References Cited

U.S. PATENT DOCUMENTS 9,199,472 B2 * 12/2015 Ishida .................... B41J 2/1714

FOREIGN PATENT DOCUMENTS

JP 2011-121277 A 6/2011

* cited by examiner

*Primary Examiner* — Lisa Solomon
(74) *Attorney, Agent, or Firm* — WORKMAN NYDEGGER

(57) ABSTRACT

A printing apparatus includes a printing medium holding unit, a carriage, a first head including a first nozzle row for ejecting a first liquid, and a suction unit including a suction port that sucks mist of the first liquid. The carriage includes a head holding plate that holds the first head and the suction unit while facing the printing medium holding unit. The head holding plate includes a first opening portion from which the first nozzle row is exposed and a second opening portion from which the suction portion is exposed. The suction unit includes a suction nozzle to which a suction port is provided. The suction nozzle can be attached to and detached from the head holding plate.

10 Claims, 17 Drawing Sheets

PRINTING APPARATUS

The present application is based on, and claims priority from JP Application Serial Number 2023-176800, filed Oct. 12, 2023, the disclosure of which is hereby incorporated by reference herein in its entirety.

BACKGROUND

1. Technical Field

The present disclosure relates to a printing apparatus.

2. Related Art

In the related art, there has been used a printing apparatus of various types that includes a carriage provided with a head for ejecting ink and a head for ejecting a reaction liquid. Among those types, in order to prevent mist of the reaction liquid from adhering to the head for ejecting the ink, there has been proposed a printing apparatus including a suction port through which the mist is sucked. For example, JP-A-2011-121277 describes that a suction port through which mist is sucked is provided between a reaction liquid head and a color ink head.

However, in the related-art printing apparatus that includes the carriage provided with the head for ejecting the ink, the head for ejecting the reaction liquid, and the suction port, the suction port is fixed to the carriage. Thus, in the related-art printing apparatus, when cleaning the suction port, an operator is required to reach a narrow area with a cleaning tool. Thus, a significant load is required for cleaning the suction port.

SUMMARY

In order to solve the above-mentioned problem, a printing apparatus according to the present disclosure includes a printing medium holding unit configured to hold a printing medium, a first head including a carriage configured to reciprocate in a scanning direction in a region facing the printing medium holding unit and a first nozzle row being provided to the carriage, the first nozzle row in which a plurality of nozzles for ejecting a first liquid are arrayed in an intersecting direction intersecting with the scanning direction, and a suction unit being provided to the carriage and including a suction port configured to suck mist of the first liquid generated at the time of ejecting the first liquid from the first head, wherein the carriage includes a head holding plate configured to hold the first head and the suction unit while facing the printing medium holding unit, the head holding plate includes a first opening portion from which the first nozzle row is exposed and a second opening portion from which the suction port is exposed, the suction unit includes a suction nozzle provided with the suction port, and the suction nozzle is attachable to and detachable from the head holding plate.

DESCRIPTION OF EMBODIMENTS

Figure 1:
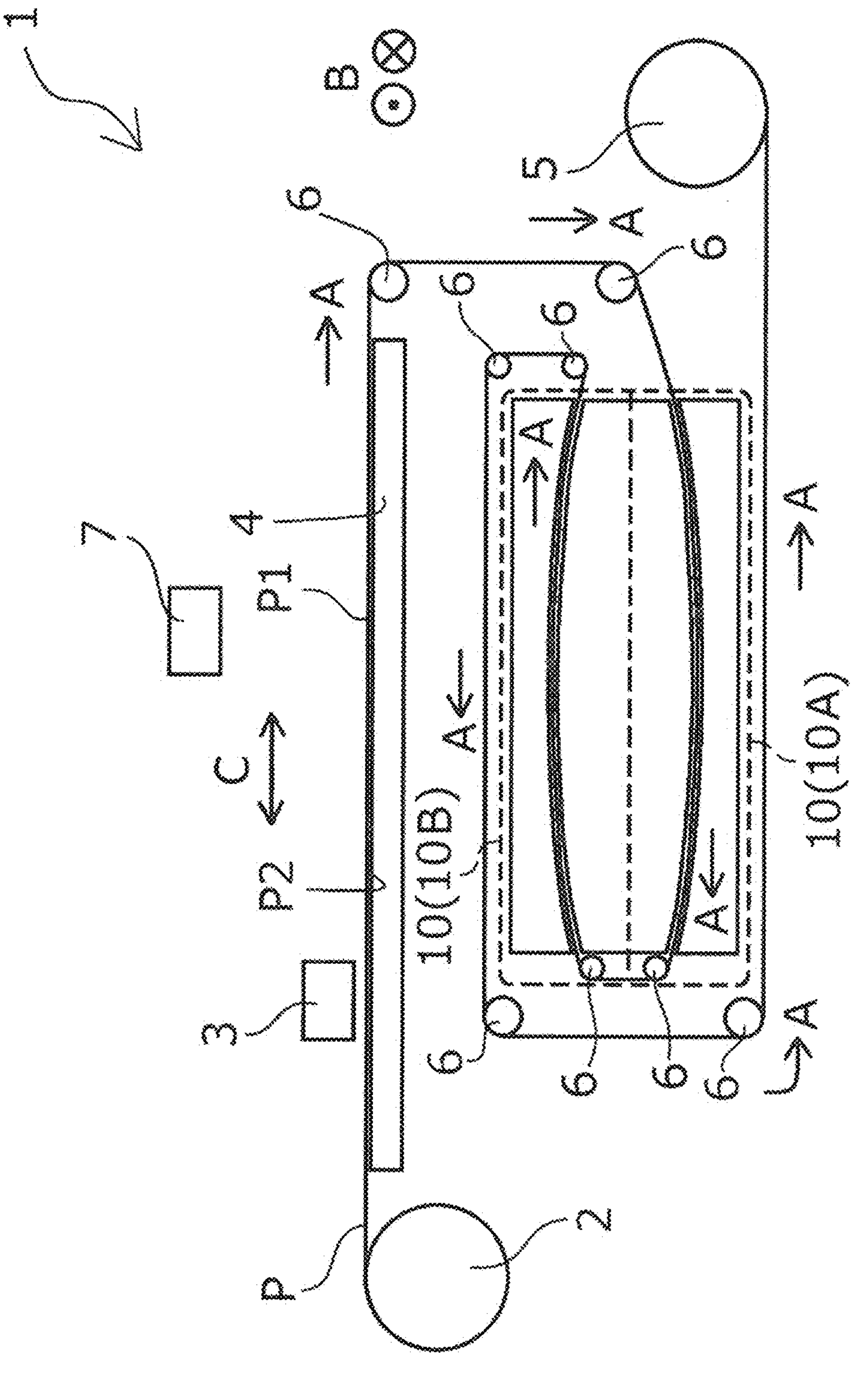
FIG. 1 is side view of a printing apparatus according to one embodiment of the present disclosure.

First, an overview of the present disclosure is described.

In order to solve the above-mentioned problem a printing apparatus according to a first aspect of the present disclosure includes a printing medium holding unit configured to hold a printing medium, a first head including a carriage configured to reciprocate in a scanning direction in a region facing the printing medium holding unit and a first nozzle row being provided to the carriage, the first nozzle row in which a plurality of nozzles for ejecting a first liquid are arrayed in an intersecting direction intersecting with the scanning direction, and a suction unit being provided to the carriage and including a suction port configured to suck mist of the first liquid generated at the time of ejecting the first liquid from the first head, wherein the carriage includes a head holding plate configured to hold the first head and the suction unit while facing the printing medium holding unit, the head holding plate includes a first opening portion from which the first nozzle row is exposed and a second opening portion from which the suction port is exposed, the suction unit includes a suction nozzle provided with the suction port, and the suction nozzle is attachable to and detachable from the head holding plate.

According to the present aspect, the suction unit includes the suction nozzle provided with the suction port, and the suction nozzle can be attached to and detached from the head holding plate. Therefore, a state that requires an operator to reach a narrow area with a cleaning tool when cleaning the suction port can be avoided. As a result, the suction port can easily be cleaned.

A second aspect of the printing apparatus according to the present disclosure is an aspect depending on the first aspect, in which the suction unit includes an attaching/detaching unit to which the suction nozzle is provided, and a pressing unit configured to be fixed to the head holding plate and be displaced between a fixed position for fixing the attaching/detaching unit to the head holding plate and an attachable/detachable position for attaching or detaching the attaching/detaching unit with respect to the head holding plate.

According to the present aspect, the suction unit includes the attaching/detaching unit to which the suction nozzle is provided, and the pressing unit that can be fixed to the head holding plate and can be displaced between the fixed position for being fixed to the head holding plate and the attachable/detachable position. With this configuration, the suction nozzle can easily be fixed to the carriage, and can easily be detached from the carriage.

A third aspect of the printing apparatus according to the present disclosure is an aspect depending on the second aspect, in which the pressing unit includes a flow path for an airflow through which the mist is sucked and an airflow generation portion that generates the airflow.

According to the present aspect, the pressing unit includes the flow path for the airflow and the airflow generation portion. Thus, the mist of the first liquid can be sucked effectively.

A fourth aspect of the printing apparatus according to the present disclosure is an aspect depending on the third aspect, in which the suction unit includes a filter configured to collect the mist sucked through the suction port, the attaching/detaching unit includes a plate-like member having the scanning direction as a short direction and the intersecting direction as a longitudinal direction, and a filter supporting portion that is provided to the plate-like member and supports the filter so that the flow path for the airflow is blocked by the filter, and the pressing unit includes a filter clamping portion, and when the pressing unit is at the fixed position, the filter is clamped between the filter supporting portion and the filter clamping portion.

According to the present aspect, the filter that collects the mist of the first liquid is provided. When the pressing unit is at the fixed position, the filter is clamped between the filter supporting portion and the filter clamping portion. Thus, it is configured that the filter can easily be replaced. With a simple operation of replacing the filter, the suction efficiency of the mist of the first liquid can be restored.

A fifth aspect of the printing apparatus according to the present disclosure is an aspect depending on the fourth aspect, in which the plate-like member includes a recessed portion being recessed in a first direction from a second surface side to a first surface side, the first surface facing the head holding plate when the attaching/detaching unit is at a position being pressed by the pressing unit at the fixed position, the second surface being opposite to the first surface, facing the filter, and extending in the longitudinal direction, and the recessed portion functions as a part of the flow path for the airflow and the suction nozzle.

According to the present aspect, the recessed portion that is recessed in the first direction is provided, and the recessed portion functions as a part of the flow path for the airflow and the suction nozzle. With this configuration, a part of the flow path for the airflow and the suction nozzle can easily be configured.

A sixth aspect of the printing apparatus according to the present disclosure is an aspect depending on the fifth aspect, and the printing apparatus includes a second head being provided to the carriage and including a second nozzle row in which a plurality of nozzles for ejecting a second liquid are arrayed in the intersecting direction, wherein the head holding plate includes a third opening portion from which the second nozzle row is exposed, the suction unit is provided between the first head and the second head in the scanning direction, the suction nozzle includes, as side walls provided from the second surface side to the first surface side, a first side wall positioned on the first head side in the scanning direction and a second side wall positioned on the second head in the scanning direction, the suction port is formed in the suction nozzle, a first end portion of the first side wall in the first direction forms a part of a contour of the suction port, and the first end portion does not protrude from the second opening portion to the printing medium holding unit side, and a second end portion of the second side wall in the first direction protrudes from the second opening portion to the printing medium holding unit side.

According to the present aspect, the first end portion does not protrude from the second opening portion to the printing medium holding unit side, and the second end portion protrudes from the second opening portion to the printing medium holding unit side. In other words, the suction port increases the suction efficiency of the first liquid, and reduces the suction efficiency of the second liquid so as to prevent mixing of the first liquid and the second liquid. With this, clogging of the suction nozzle is less likely to occur.

A seventh aspect of the printing apparatus according to the present disclosure is an aspect depending on the sixth aspect, in which the second liquid is ink containing a color material, and the first liquid is a reaction liquid that reacts with the color material.

According to the present aspect, the second liquid is the ink containing the color material, and the first liquid is the reaction liquid that reacts with the color material. In a case of such a configuration, when the first liquid and the second liquid are mixed in the suction nozzle, clogging is more likely to occur. However, the suction port increases the suction efficiency of the first liquid, and reduces the suction efficiency of the second liquid so as to prevent mixing of the first liquid and the second liquid. With this, clogging of the suction nozzle is less likely to occur.

An eighth aspect of the printing apparatus according to the present disclosure is an aspect depending on the sixth aspect, in which the suction nozzle includes a bottom portion being continuous with the second end portion and extending to the first head side, a length of the bottom portion in the scanning direction is smaller than a length between the first side wall and the second side wall in the scanning direction, and an end portion of the bottom portion on the first head side in the scanning direction forms a part of a contour of the suction port.

According to the present aspect, the length of the bottom portion of the suction nozzle in the scanning direction is smaller than the length between the first side wall and the second side wall in the scanning direction, and the end portion of the bottom portion on the first head side in the scanning direction forms a part of the contour of the suction port. With this configuration, the mist of the first liquid can selectively be sucked.

A ninth aspect of the printing apparatus according to the present disclosure is an aspect depending on the eighth aspect, in which a distance from the printing medium holding unit to the bottom portion is larger than a distance from the printing medium holding unit to a nozzle formation surface at which the nozzles of the first head are formed.

According to the present aspect, the distance from the printing medium holding unit to the bottom portion is larger than the distance from the printing medium holding unit to the nozzle formation surface of the first head. With this configuration, in particular, the mist of the first liquid can effectively be sucked, and the bottom portion is less likely to contact with the printing medium.

A tenth aspect of the printing apparatus according to the present disclosure is an aspect depending on any one of the fourth aspect to the ninth aspect, in which the head holding plate includes an engaging portion on a plate-like member facing surface that faces the plate-like member, and the plate-like member is provided with an engaged portion that is engaged with the engaging portion when the attaching/detaching unit is at a position where the attaching/detaching unit is pressed by the pressing unit at the fixed position.

According to the present aspect, the head holding plate includes the engaging portion on the plate-like member facing surface that faces the plate-like member, and the plate-like member is provided with the engaged portion that is engaged with the engaging portion when the attaching/detaching unit is at the position of being pressed by the pressing unit at the fixed position. Thus, the engaged portion of the plate-like member is engaged with the engaging portion of the head holding plate, and thus the suction unit can be positioned suitably with respect to the carriage.

Embodiments according to the present disclosure are described in detail below with reference to the drawings. First, with reference to FIG. 1, one example of an overview of the printing apparatus 1 of the present disclosure is described. As illustrated in FIG. 1, the printing apparatus 1 of the present embodiment includes a setting unit 2 at which a printing medium P in a roll form is to be set, a winding unit 5 that winds up the printing medium P conveyed from the setting unit 2, and a printing unit 3 that forms an image by ejecting ink containing a color material onto a printing surface P1 of the printing medium P conveyed in a conveyance direction A in a conveyance path from the setting unit 2 to the winding unit 5. Although details of the printing unit 3 are described later, the printing unit 3 of the present embodiment is also configured to eject a reaction liquid that reacts with the color material of the ink.

The printing apparatus 1 of the present embodiment further includes a platen 4 as a printing medium holding unit that holds the printing medium P in an image formation region in which the printing unit 3 forms an image, and a plurality of rollers 6 that are provided in the conveyance path of the printing medium P. The printing apparatus 1 of the present embodiment includes, as the rollers 6, a driving roller that serves as a conveyance unit and applies a conveyance force to the printing medium P and a driven roller that is driven to rotate as the printing medium P is conveyed.

The printing unit 3 is provided on the side facing the printing surface P1 of the printing medium P conveyed in the conveyance direction A, and forms an image by ejecting the ink onto the printing surface P1 while a back surface P2 opposite to the printing surface P1 of the printing medium P is supported on the platen 4. Specifically, the printing apparatus 1 of the present embodiment performs printing by moving the printing unit 3 back and forth in a scanning direction C along the conveyance direction A. More specifically, the printing apparatus 1 of the present embodiment intermittently drives (intermittently conveys) the printing medium P in the conveyance direction A, and moves the printing unit 3 back and forth in the scanning direction C to perform printing by ejecting ink from the printing unit 3.

The printing unit 3 of the present embodiment can complete the image formation of the entire image formation region supported by the platen 4 in the printing surface P1 through a single scan (single pass), and can complete the image formation of the entire image formation region by performing the scanning multiple times (a plurality of passes). When the image formation is completed by a plurality of passes, the conveyance stop time of the printing medium P due to the intermittent conveyance is naturally longer than that in a case in which the image formation is completed by a single pass.

The printing unit 3 of the present embodiment is configured to perform printing by moving back and forth in the scanning direction C along the conveyance direction A. However, the configuration of the printing unit 3 is not particularly limited. In place of the printing unit 3 that performs printing by moving back and forth in the scanning direction C along the conveyance direction A, the printing unit 3 may be included that performs printing by moving back and forth in a width direction B intersecting the conveyance direction A, or a so-called line head may be included that performs printing in the state where the printing unit 3 is stopped with nozzles provided side by side along the width direction B and configured to eject ink over the entirety of the width direction B of the printing medium P.

As illustrated in FIG. 1, a drying unit 10 that dries the ink ejected to the printing medium P is provided at a position downstream of the printing unit 3 in the conveyance direction A in the conveyance path of the printing medium P. In the conveyance path of the printing medium P from the printing unit 3 to the drying unit 10, and the conveyance path of the printing medium P from the drying unit 10 to the winding unit 5, the plurality of rollers 6 are provided. The printing apparatus 1 of the present embodiment includes, as the drying unit 10, a first drying unit 10A at which the printing medium P first arrives from the printing unit 3 and a second drying unit 10B that can further dry the printing medium P after the printing medium P is dried by the first drying unit 10A. As illustrated in FIG. 1, in the present embodiment, the first drying unit 10A and the second drying unit 10B are provided vertically. However, the present disclosure is not limited to such a configuration.

Figure 2:
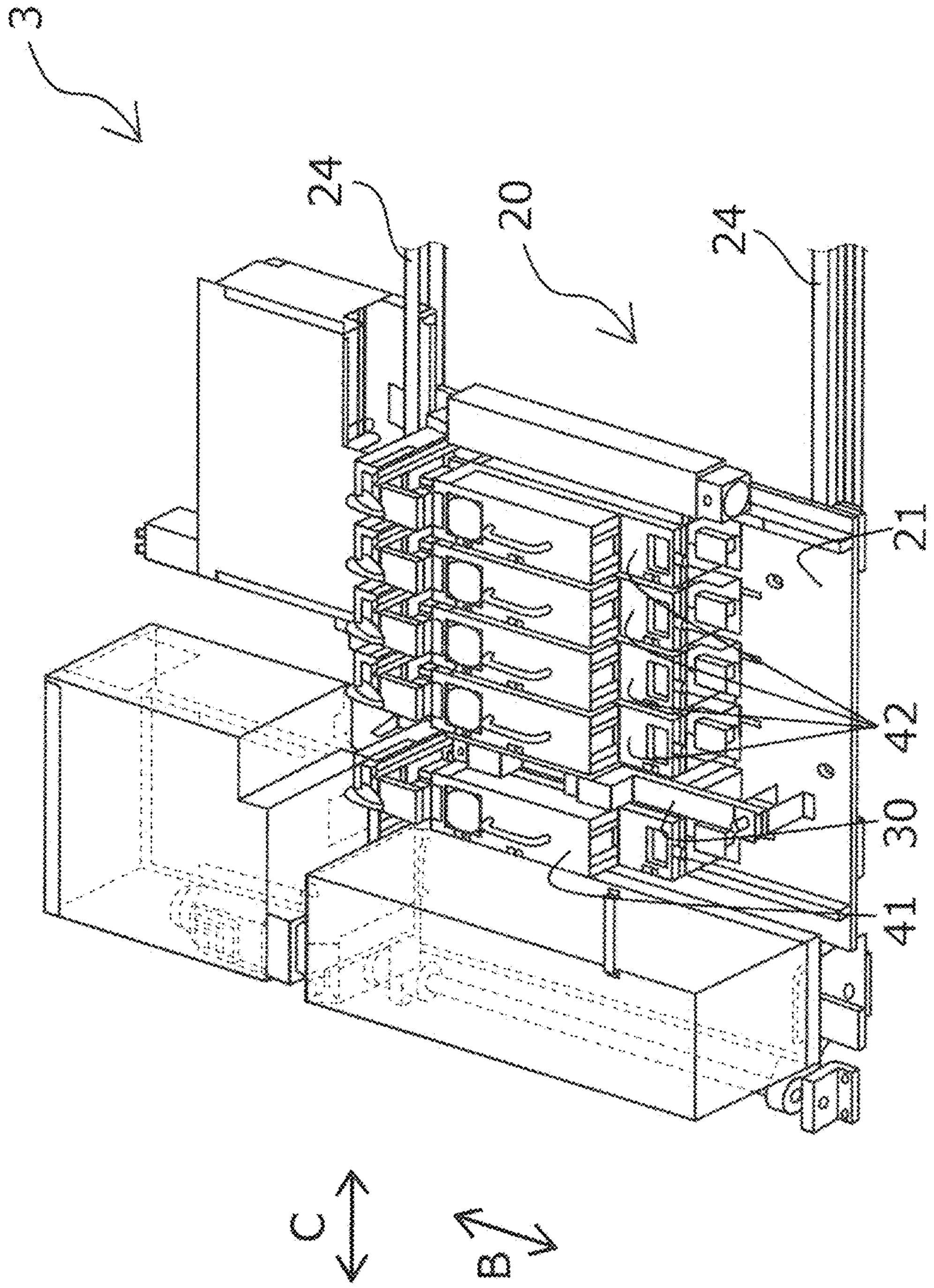
FIG. 2 is a perspective view illustrating a periphery of a lever illustrating a periphery of a carriage of the printing apparatus in FIG. 1 when viewed from above.
Figure 3:
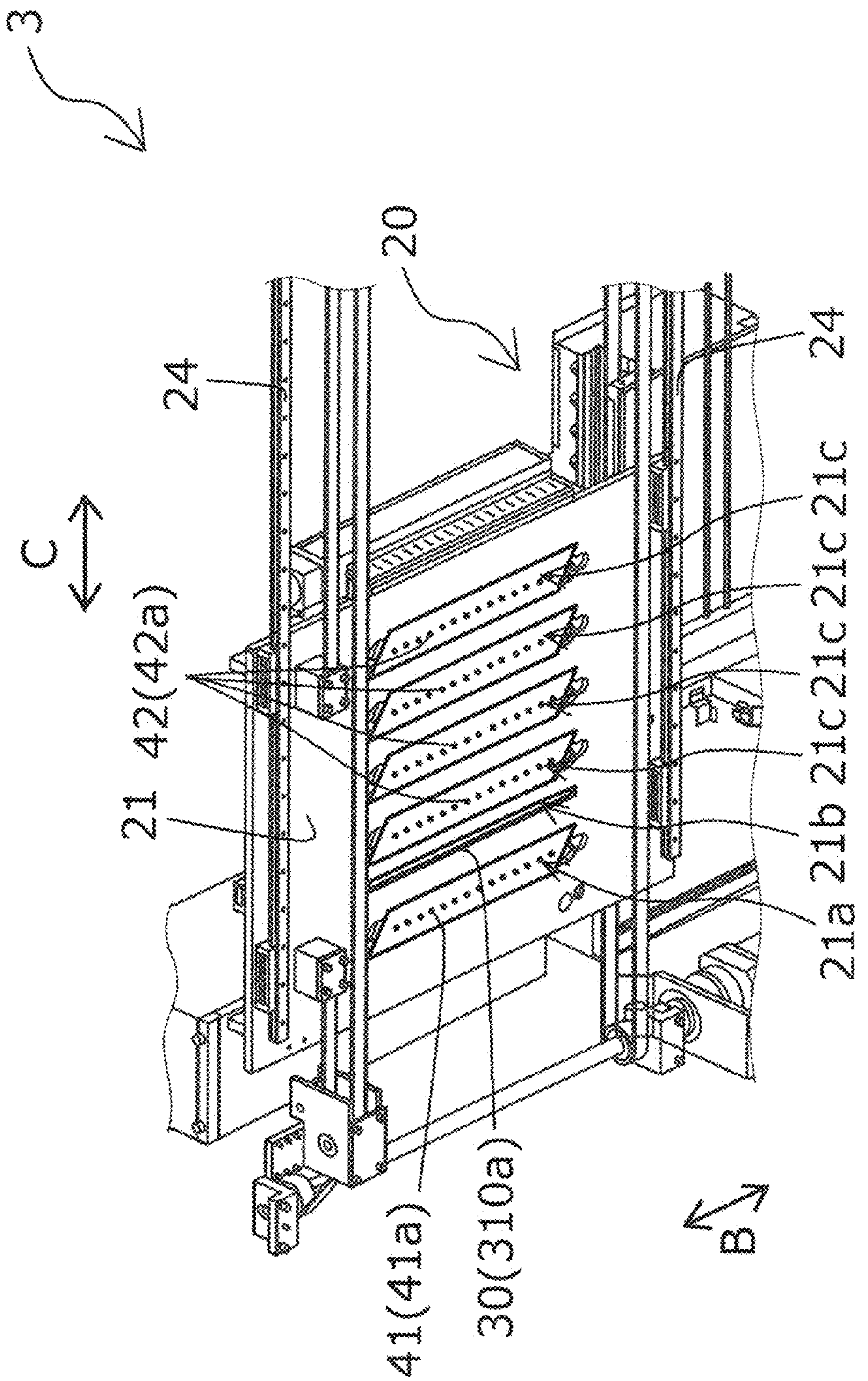
FIG. 3 is a perspective view illustrating the periphery of the carriage of the printing apparatus in FIG. 1 when viewed from below.
Figure 4:
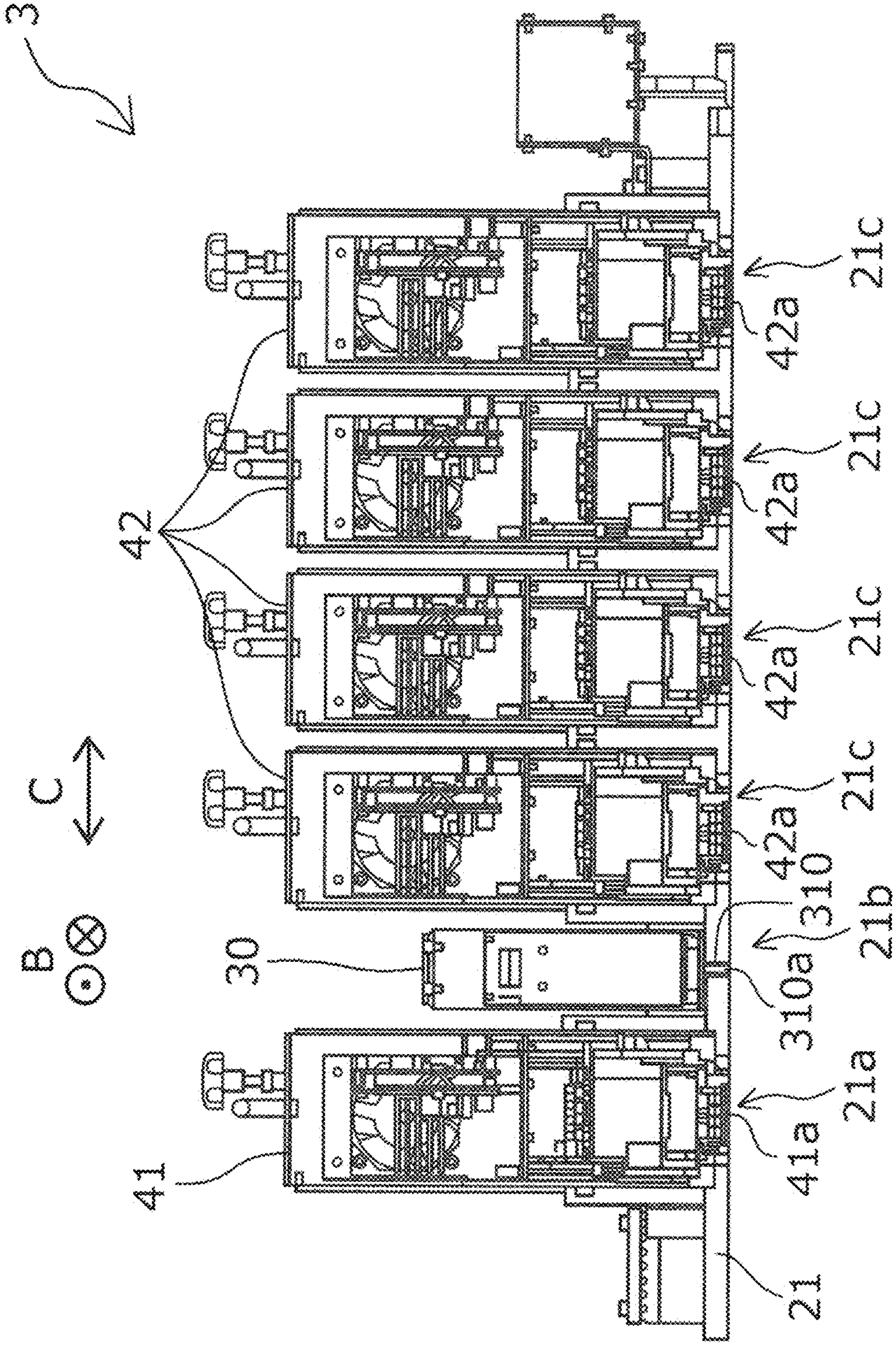
FIG. 4 is a side view illustrating arrangement of a suction unit on the carriage of the printing apparatus in FIG. 1.

With reference to FIG. 2 to FIG. 4, details of the printing apparatus 1 of the printing unit 3 of the present embodiment are described. As illustrated in FIG. 2 and FIG. 3, the printing unit 3 includes a carriage 20 that reciprocates in a scanning direction C along a rail 24 in a region facing the platen 4. The carriage 20 includes the head holding plate 21. A first head 41, a suction unit 30, and a second head 42 are attached to the head holding plate 21. The first head 41 includes a first nozzle row 41*a* in which a plurality of nozzles for ejecting the reaction liquid being a first liquid are arrayed in a width direction intersecting with the scanning direction C. The suction unit 30 includes a suction port 310*a* that sucks mist of the reaction liquid generated at the time of ejecting the reaction liquid from the first head 41. The section head 42 includes a second nozzle row 42*a* in which a plurality of nozzles for ejecting the ink being a second liquid are arrayed in the width direction B. Note that, in the present embodiment, one first head 41, one suction unit 30, and four second heads 42 are attached to the head holding plate 21, but the numbers thereof are not particularly limited.

The head holding plate 21 holds the first head 41, the suction unit 30, and the second head 42 while facing the platen 4. As illustrated in FIG. 3 and FIG. 4, the head holding plate 21 is provided with a first opening portion 21*a* from which the first nozzle row 41*a* is exposed, a second opening portion 21*b* from which the suction port 310*a* is exposed, and a third opening portion 21*c* from which the second nozzle row 42*a* is exposed.

As illustrated in FIG. 4, the suction unit 30 includes a suction nozzle 310 provided with the suction port 310*a*. Although details are described later, the suction nozzle 310 is attachable and detachable with respect to the head holding plate 21. Therefore, in the printing apparatus 1 of the present embodiment, when the flow path for the airflow, such as the suction port 310*a*, is cleaned, the suction nozzle 310 can be removed from the carriage 20, and the flow path for the airflow, such as the suction port 310*a*, can be cleaned by using a cotton swab or the like. In other words, according to the printing apparatus 1 of the present embodiment, a state that requires an operator to reach a narrow area with a cleaning tool can be avoided. As a result, the suction port 310*a* can easily be cleaned.

Figure 5:
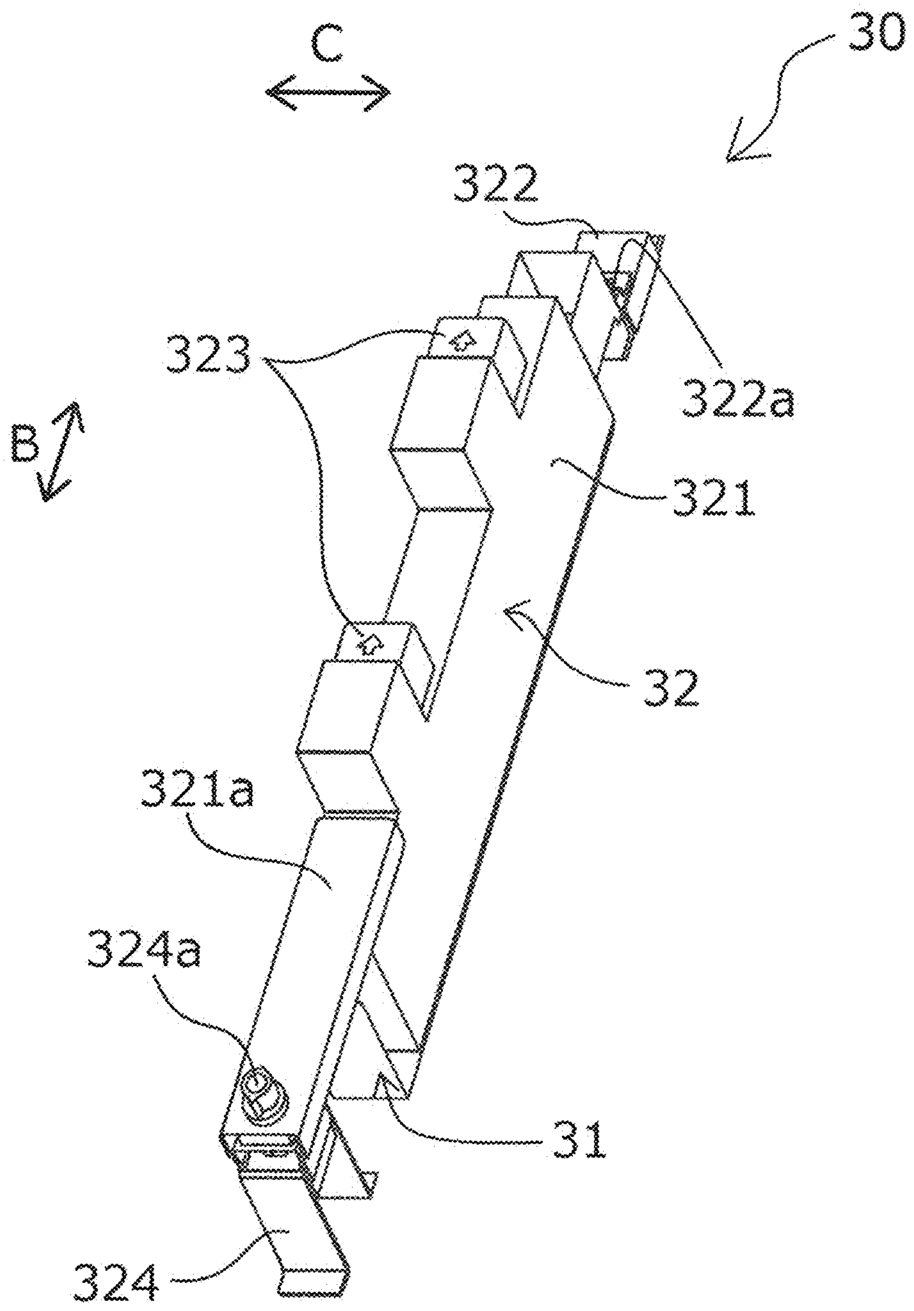
FIG. 5 is a perspective view of the suction unit of the printing apparatus in FIG. 1, illustrating a state in which a pressing unit is at a fixed position.
Figure 6:
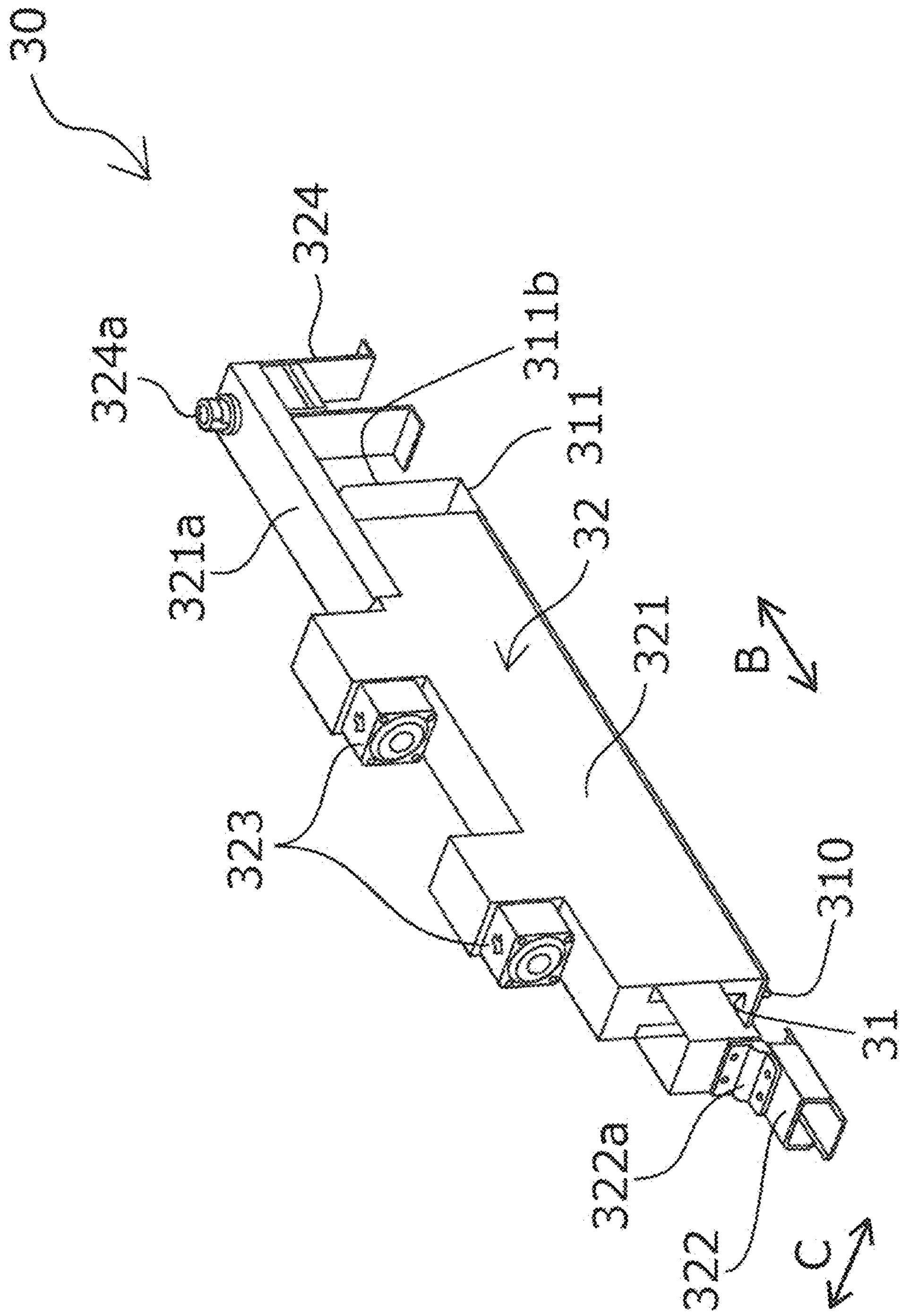
FIG. 6 is a perspective view of the suction unit of the printing apparatus in FIG. 1 when viewed from a direction different from FIG. 5.
Figure 7:
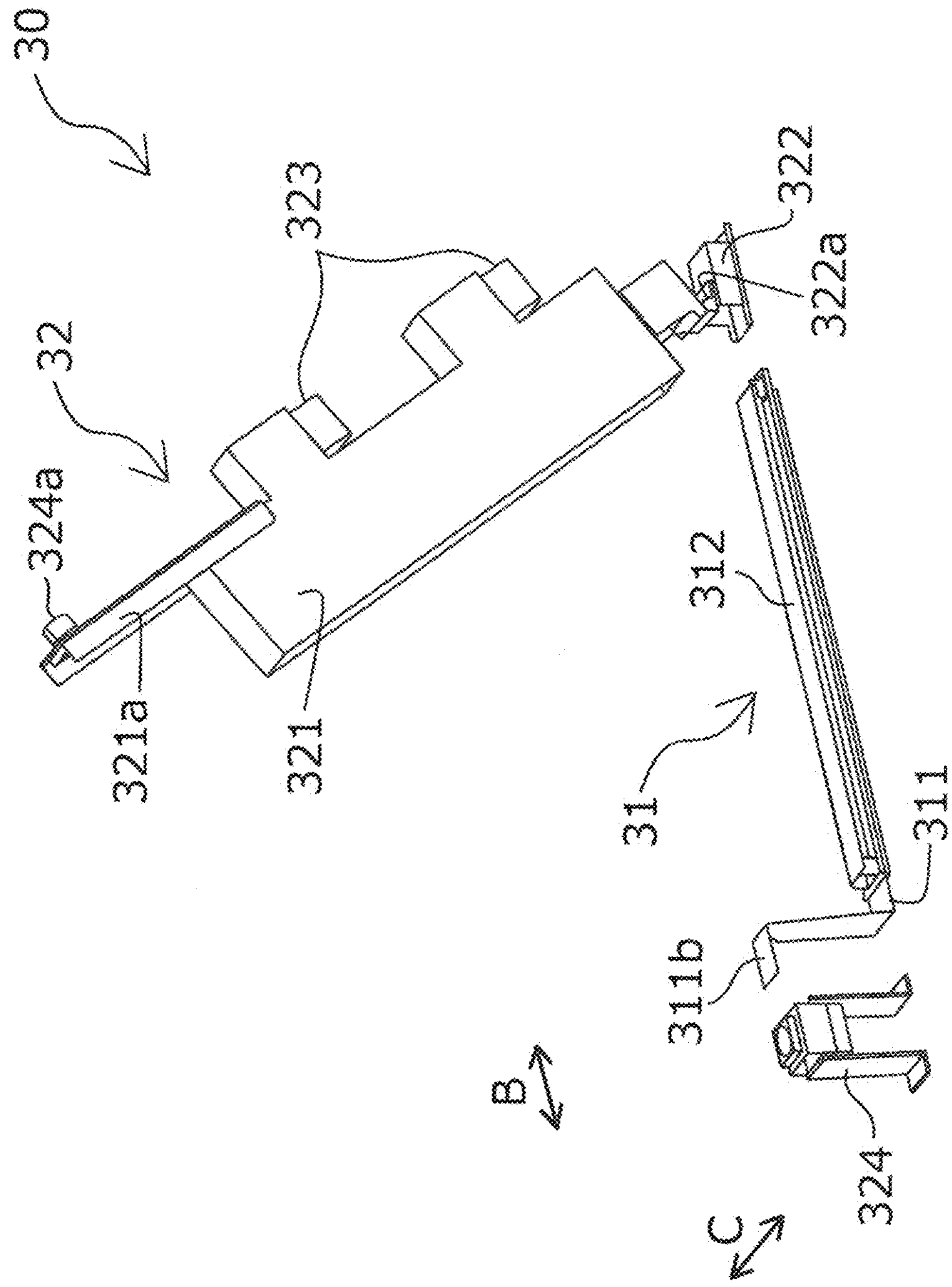
FIG. 7 is a perspective view of the suction unit of the printing apparatus in FIG. 1, illustrating a state in which the pressing unit is at an attachable/detachable position.
Figure 8:
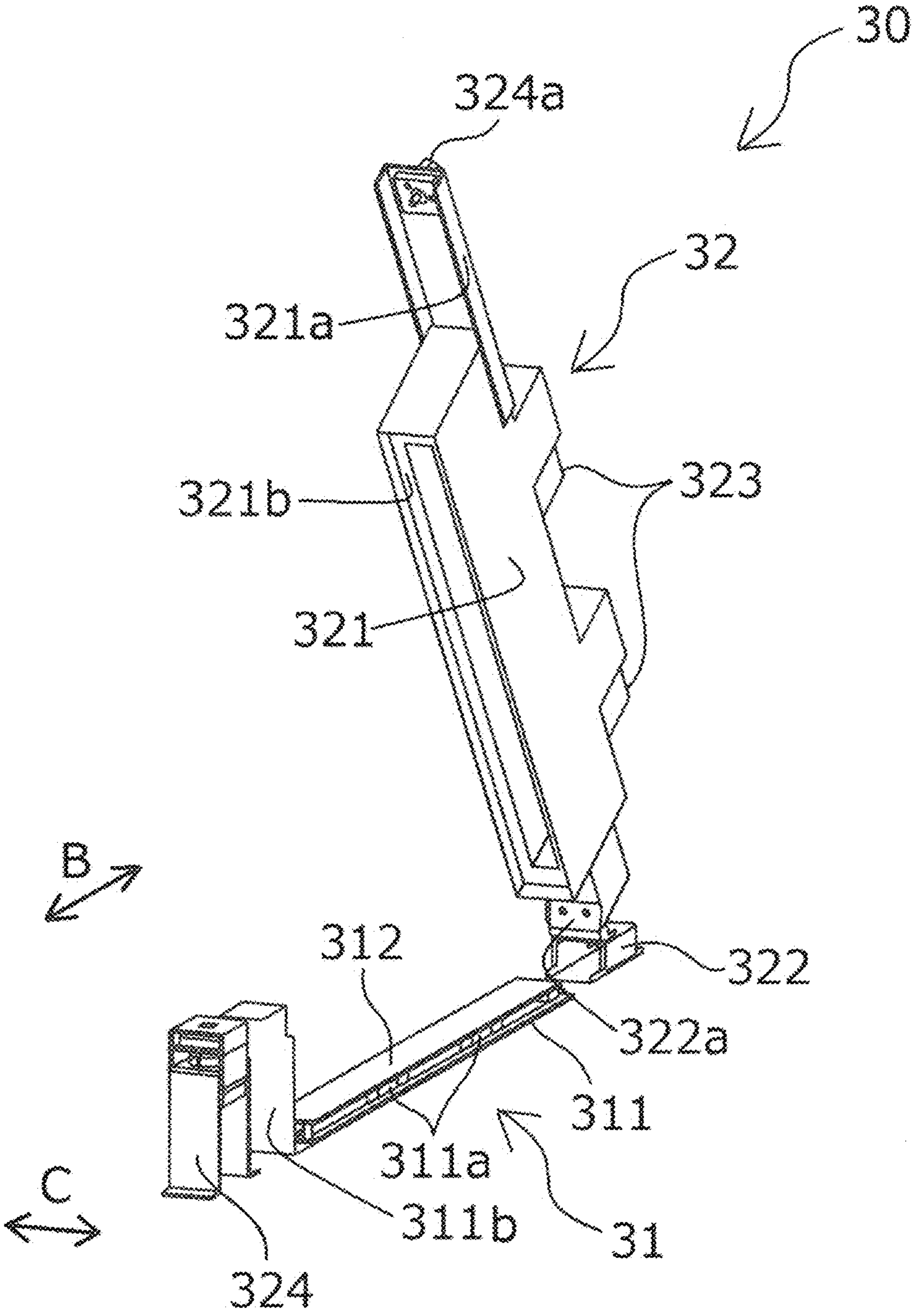
FIG. 8 is a perspective view of the suction unit of the printing apparatus in FIG. 1 when viewed from a direction different from FIG. 7.
Figure 9:
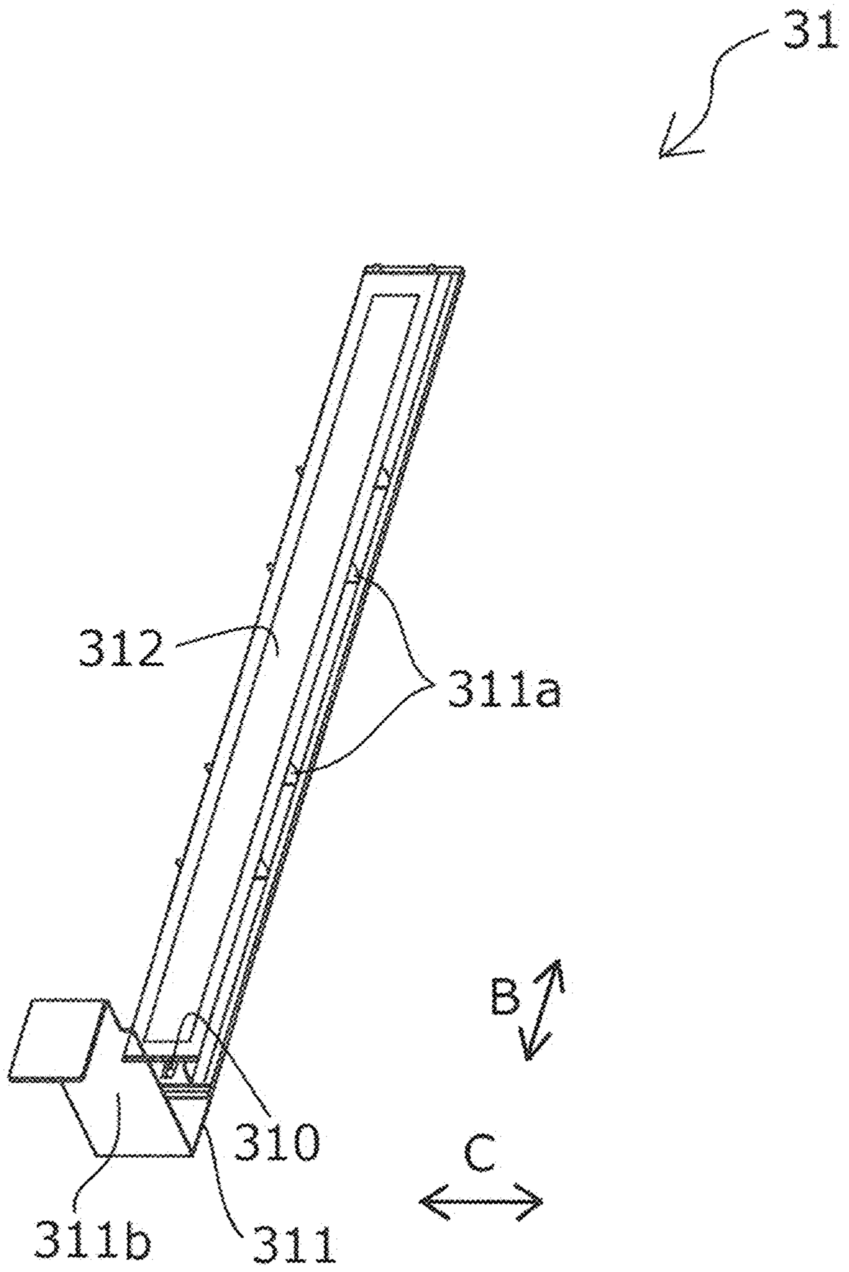
FIG. 9 is a perspective view illustrating an attaching/detaching unit of the suction unit of the printing apparatus in FIG. 1.

With reference to FIG. 5 to FIG. 17, the suction unit 30 being a main part of the printing apparatus 1 of the present embodiment is further described below in detail. As illustrated in FIG. 5 to FIG. 8, the suction unit 30 includes an attaching/detaching unit 31 and a pressing unit 32. As illustrated in FIG. 12 and the like, the suction nozzle 310 is provided to the attaching/detaching unit 31. The pressing unit 32 can be fixed to the head holding plate 21, and can be displaced between a fixed position, which is illustrated in FIG. 5 and FIG. 6, for fixing the attaching/detaching unit 31 to the head holding plate 21 and an attachable/detachable position, which is illustrated in FIG. 7 and FIG. 8, for attaching or detaching the attaching/detaching unit 31 with respect to the head holding plate 21. The printing apparatus 1 of the present embodiment is thus configured. Therefore, the suction nozzle 310 can easily be fixed to the carriage 20, and can easily be detached from the carriage 20.

Figure 16:
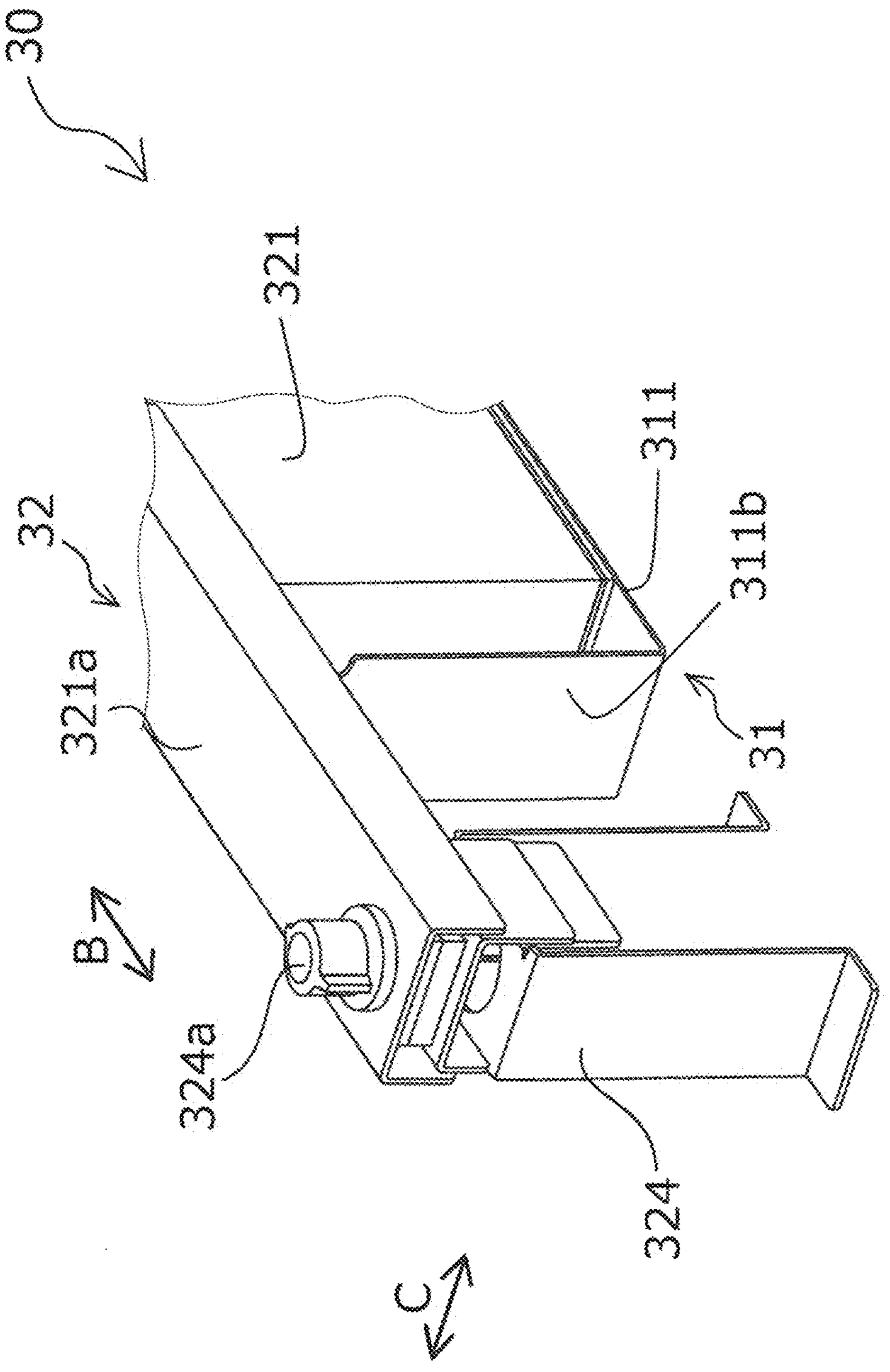
FIG. 16 is a perspective view illustrating a locking portion of the pressing unit of the suction unit of the printing apparatus in FIG. 1.

As illustrated in FIG. 5 to FIG. 8 and the like, the pressing unit 32 includes a main body portion 321, a fixing portion 322, and a fitting portion 324. The fixing portion 322 is fixed to the head holding plate 21, and can turn the main body portion 321 about a hinge 322*a* with a turning axis in a direction along the scanning direction C. The fitting portion 324 is fixed to the head holding plate 21. As illustrated in FIG. 16 and the like, in a locking portion of the pressing unit 32, a fixing screw 324*a* attached to a fixing screw formation portion 321*a* of the main body portion 321 is fitted, and the fixing screw formation portion 321*a* as a whole is fitted and fixed to the fitting portion 324 by using the fixing screw 324*a*. With this, the main body portion 321 of the pressing unit 32 can be locked at the fixed position.

In the printing apparatus 1 of the present embodiment, the pressing unit 32 is configured to turn as described above, but is not limited to this configuration. For example, in place of the configuration in which the pressing unit 32 turns, the pressing unit 32 may be configured to slide along the width direction B, or the pressing unit 32 may be configured to be removable.

Figure 15:
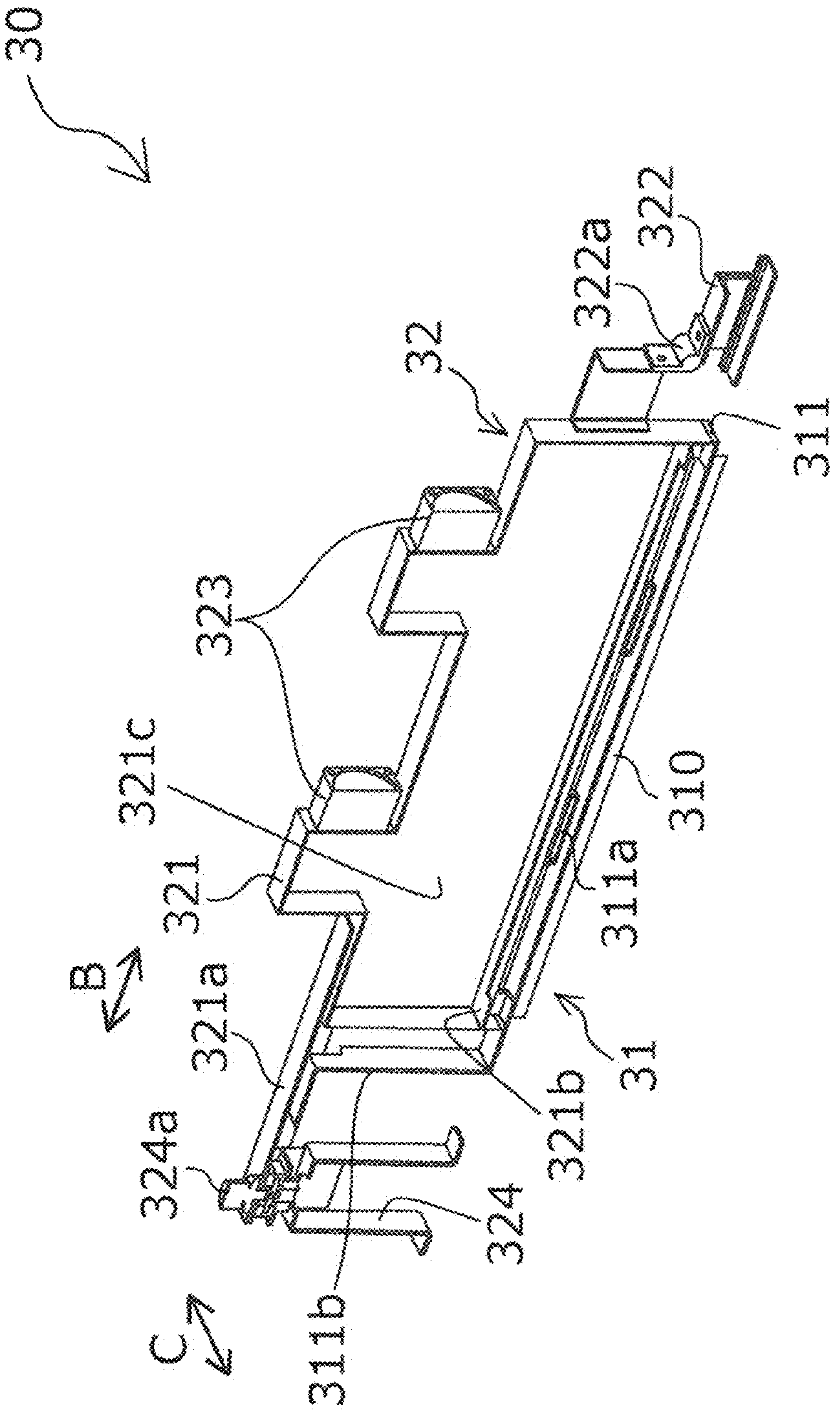
FIG. 15 is a perspective cross-sectional view of the suction unit of the printing apparatus in FIG. 1.

As illustrated in FIG. 15, in the pressing unit 32, an inner portion 321*c* of the main body portion 321 serves as the flow path for the airflow through which the mist of the reaction liquid is sucked. As illustrated in FIG. 5 to FIG. 8 and FIG. 15, the main body portion 321 includes an airflow generation portion 323 being a fan that generates the airflow. The printing apparatus 1 of the present embodiment is thus configured. Therefore, the mist of the reaction liquid can effectively be sucked.

Figure 10:
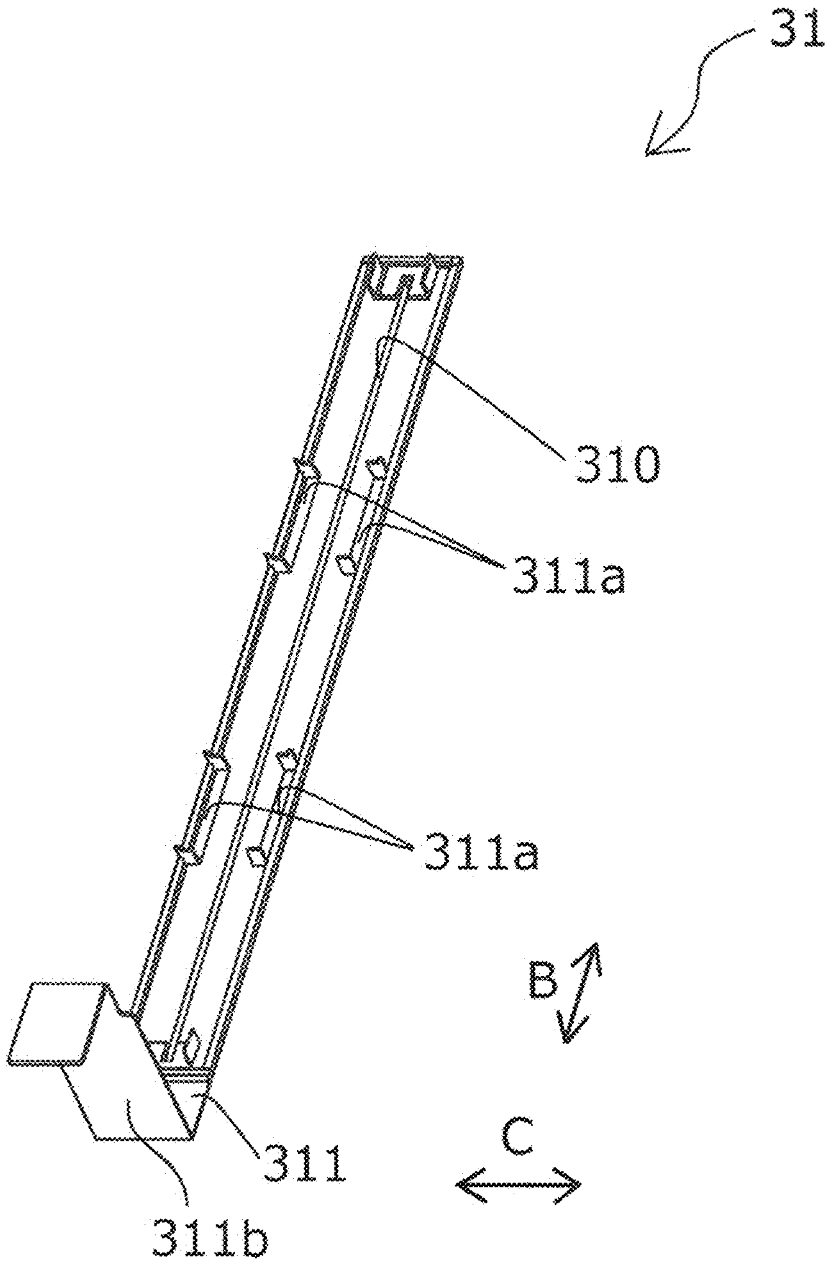
FIG. 10 is a perspective view illustrating a state in which a filter is removed from the attaching/detaching unit in FIG. 9.
Figure 11:
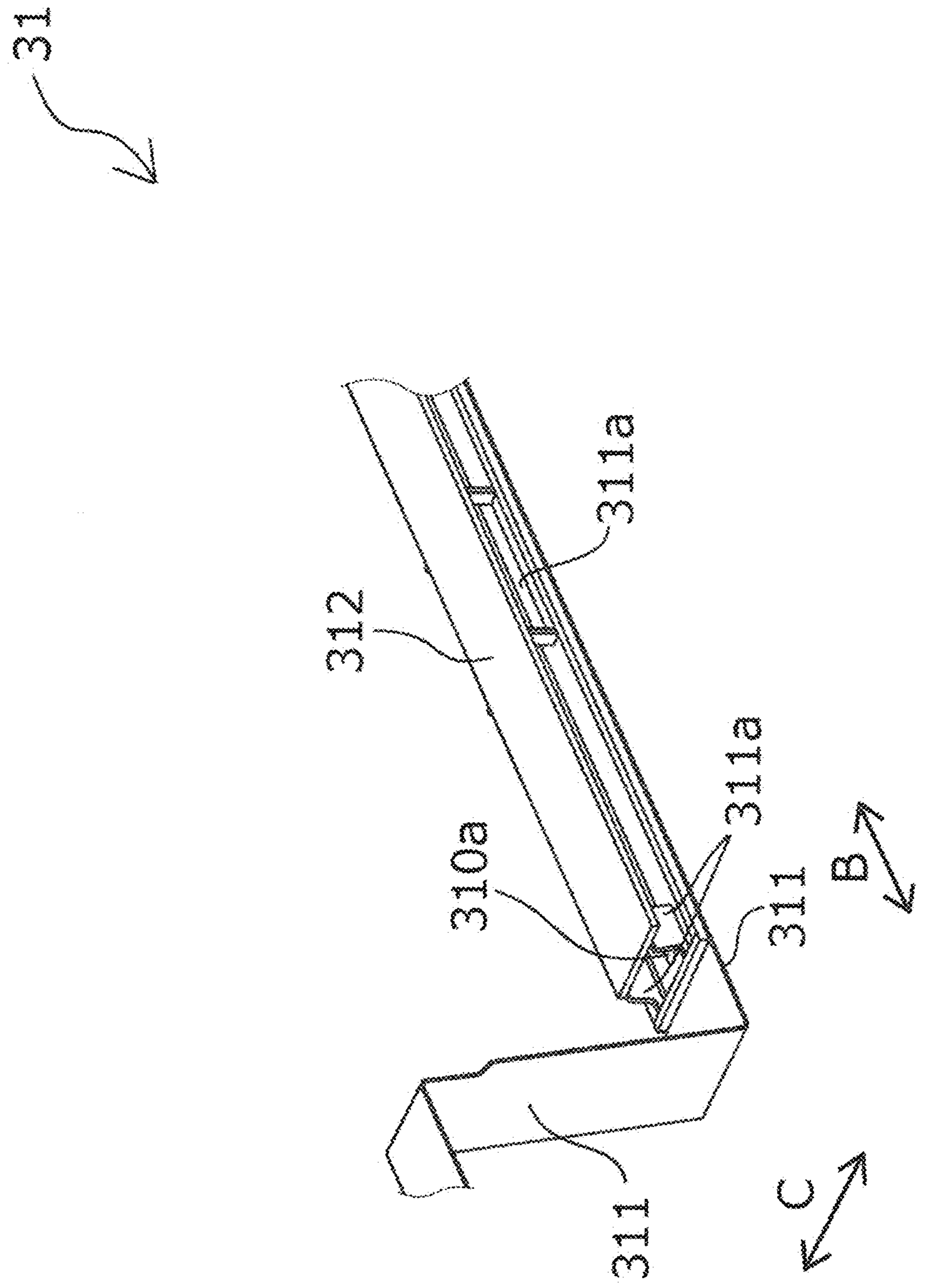
FIG. 11 is a perspective view of the attaching/detaching unit in FIG. 9, illustrating a part thereof in an enlarged manner.
Figure 12:
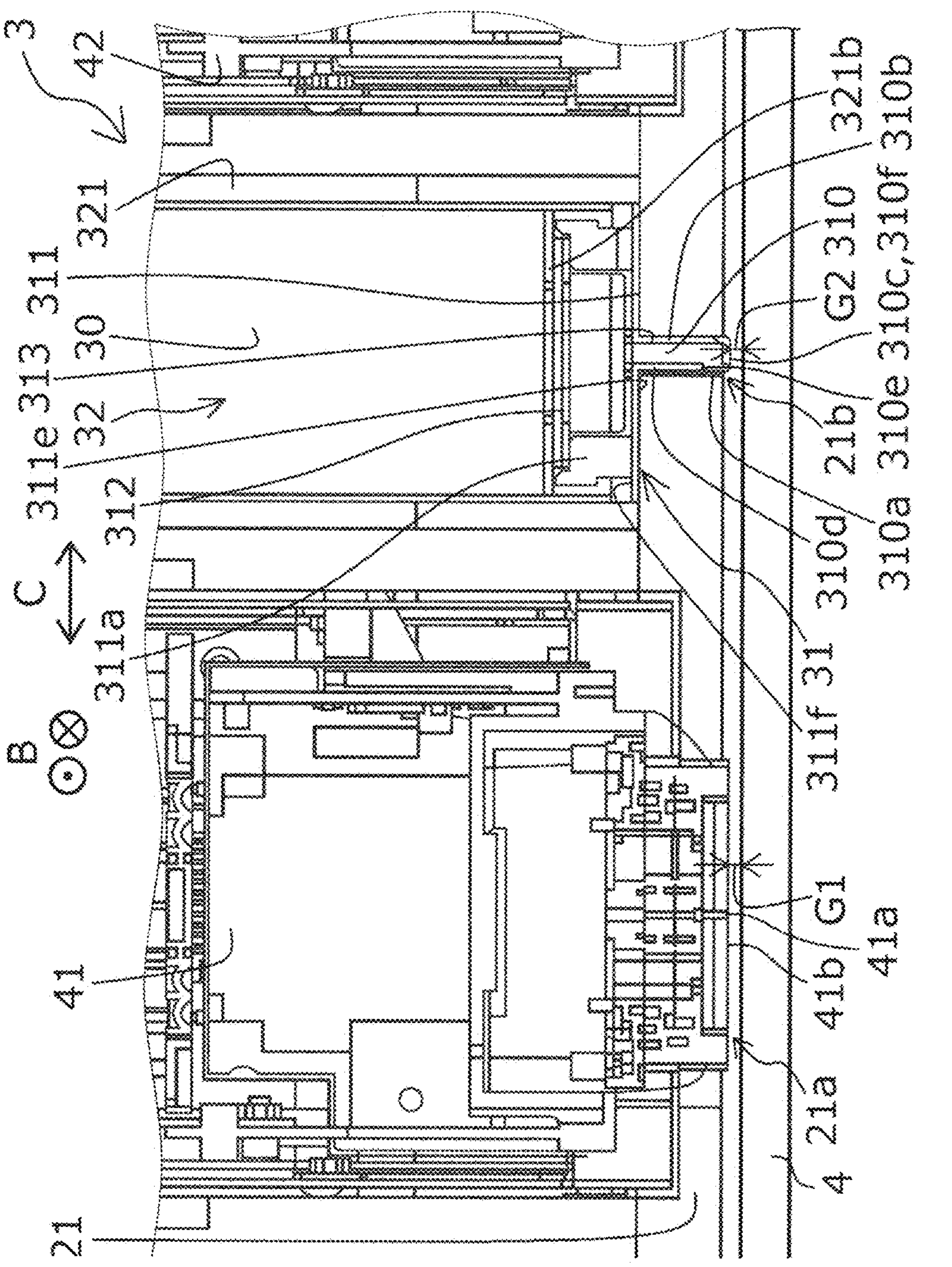
FIG. 12 is a side view illustrating a part of FIG. 4 in an enlarged manner.

As illustrated in FIG. 7 to FIG. 9 and FIG. 11 to FIG. 13, the suction unit 30 includes a filter 312 that collects the mist of the reaction liquid sucked through the suction port 310*a*. As illustrated in FIG. 10 and the like, the attaching/detaching unit 31 includes a plate-like member 311 having the scanning direction C as a short direction and the width direction B as a longitudinal direction and a filter supporting portion 311*a* that is provided to the plate-like member 311 and supports the filter 312 so that the flow path for the airflow is blocked by the filter 312. The suction nozzle 310 is also provided to the plate-like member 311.

Figure 13:
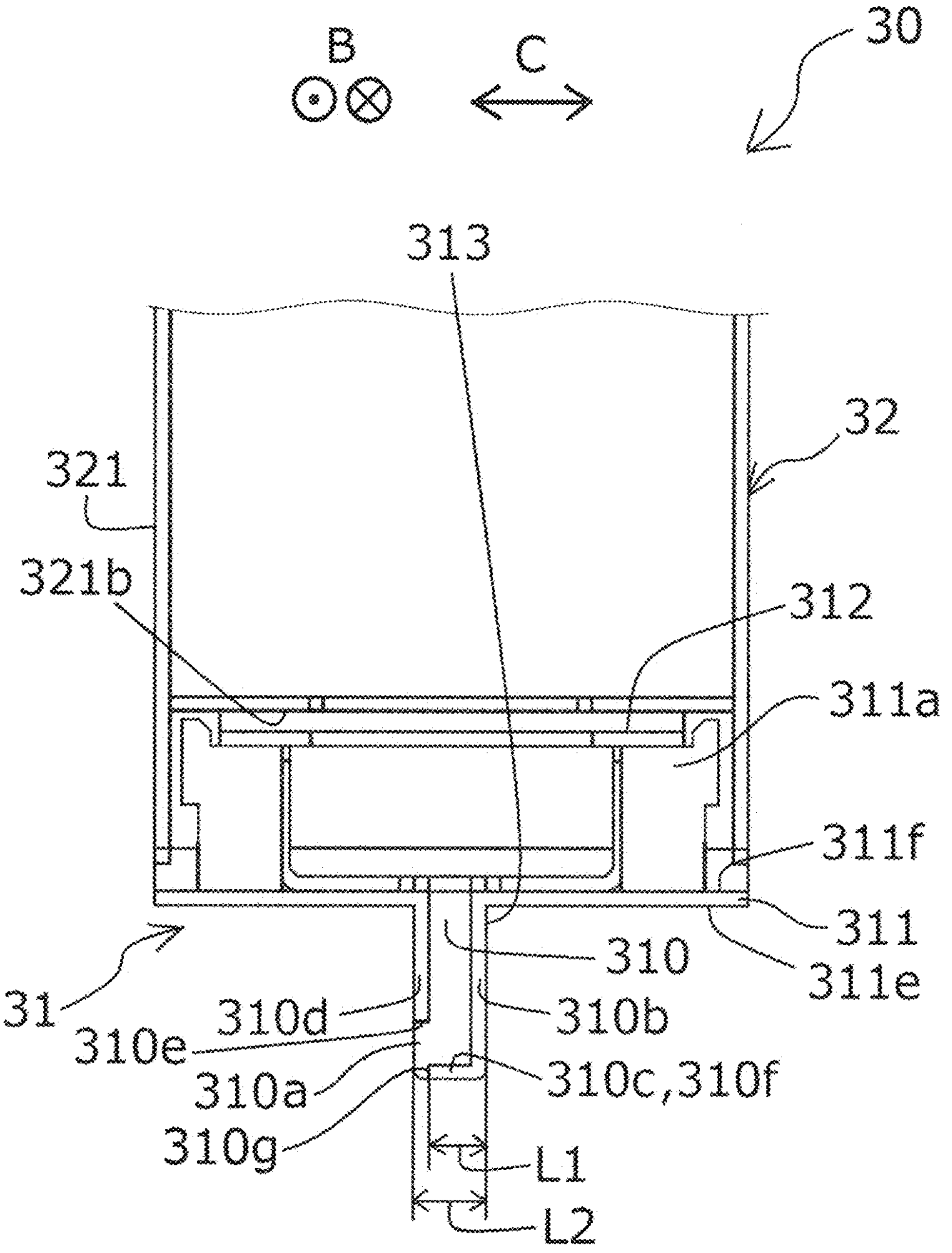
FIG. 13 is a side view illustrating a part of the suction unit in FIG. 4 in an enlarged manner.

As illustrated in FIG. 8, FIG. 12, and FIG. 13, the pressing unit 32 includes a filter clamping portion 321*b*. As illustrated in FIG. 12 and FIG. 13, when the pressing unit 32 is at the fixed position, the filter 312 is clamped between the filter supporting portion 311*a* and the filter clamping portion 321*b*. The printing apparatus 1 of the present embodiment is thus configured. Therefore, the filter 312 can easily be replaced. With a simple operation of replacing the filter 312, the suction efficiency of the mist of the reaction liquid can be restored.

In other words, in the printing apparatus 1 of the present embodiment, the attaching/detaching unit 31 including the suction nozzle 310 is provided as a separate member from the pressing unit 32. With this, the filter 312 can be replaced. Further, in the printing apparatus 1 of the present embodiment, the plate-like member 311 is provided with a gripping portion 311*b* that can be gripped by an operator at the time of removing the suction nozzle 310 from the carriage 20. With this, in particular, the filter 312 can easily be replaced.

The plate-like member 311 includes a first surface 311*e* and a second surface 311*f*. When the attaching/detaching unit 31 is at the position of being pressed by the pressing unit 32 at the fixed position, which is illustrated in FIG. 12 and the like, the first surface 311*e* faces the head holding plate 21, and the second surface 311*f* opposite to the first surface 311*e* faces the filter 312. The plate-like member 311 extends in the longitudinal direction (width direction B), which is illustrated in FIG. 11 and the like, and includes a recessed portion 313 that is recessed in a first direction (downward direction) from the second surface 311*f* side to the first surface 311*e* side, which is illustrated in FIG. 12. The recessed portion 313 functions as a part of the flow path for the airflow and the suction nozzle 310. The printing apparatus 1 of the present embodiment is thus configured. Therefore, a part of the flow path for the airflow and the suction nozzle 310 can easily be configured.

As illustrated in FIG. 4 and the like, the suction unit 30 is provided between the first head 41 and the second head 42 in the scanning direction C. As illustrated in FIG. 13, as side walls provided from the second surface 311*f* side to the first surface 311*e* side, the suction nozzle 310 includes a first side wall 310*d* positioned on the first head 41 side in the scanning direction C and a second side wall 310*b* positioned on the second head 42 in the scanning direction C. As illustrated in FIG. 13, the suction port 310*a* is formed in the suction nozzle 310, and a first end portion 310*e* of the first side wall 310*d* in the first direction (downward direction) forms a part of the contour of the suction port 310*a*.

As illustrated in FIG. 12, the first end portion 310*e* does not protrude from the second opening portion 21*b* toward the platen 4, and a second end portion 310*c* of the second side wall 310*b* in the first direction protrudes from the second opening portion 21*b* toward the platen 4 (downward). When the reaction liquid and the ink are mixed in the suction nozzle 310, clogging is more likely to occur. The printing apparatus 1 of the present embodiment is configured so that the suction port 310*a* increases the suction efficiency of the reaction liquid and reduces the suction efficiency of the ink to prevent mixing of the reaction liquid and the ink. With this, clogging of the suction nozzle 310 is less likely to occur.

Figure 14:
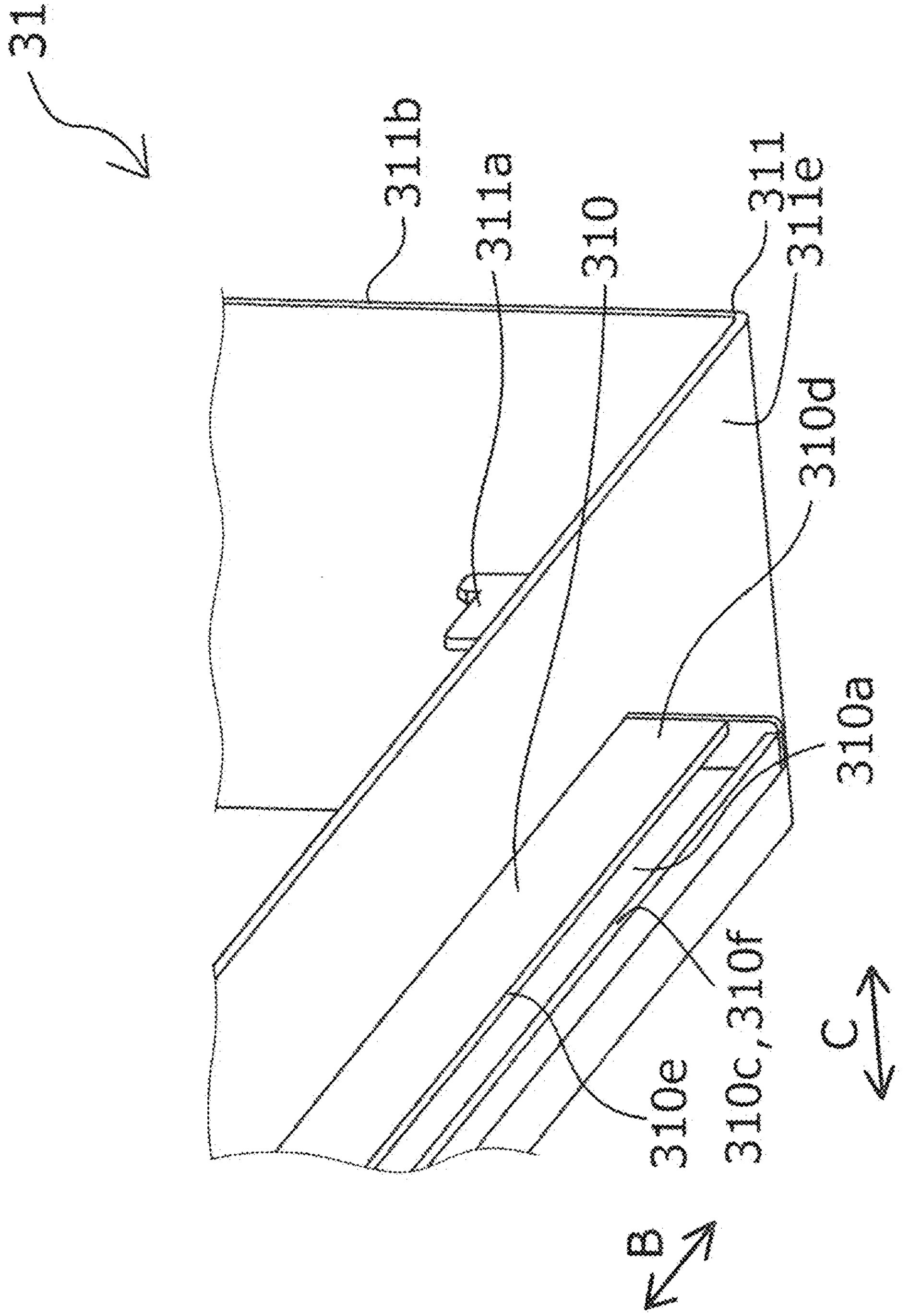
FIG. 14 is a perspective view of a part of the attaching/detaching unit of the suction unit of the printing apparatus in FIG. 1 when viewed from below.

From another viewpoint, as illustrated in FIG. 12 to FIG. 14, the suction nozzle 310 includes a bottom portion 310*f* that is continuous with the second end portion 310*c* and extends to the first head 41 side. As illustrated in FIG. 13, a length L1 of the bottom portion 310*f* in the scanning direction C is smaller than a length L2 between the first side wall 310*d* and the second side wall 310*b* in the scanning direction C, and an end portion 310*g* of the bottom portion 310*f* on the first head 41 side in the scanning direction C forms a part of the contour of the suction port 310*a*. With such a configuration in which the suction port 310*a* is oriented toward the first head 41, the mist of the reaction liquid can selectively sucked.

As illustrated in FIG. 12, in the printing apparatus 1 of the present embodiment, a distance G2 from the platen 4 to the bottom portion 310*f* is larger than a distance G1 from the platen 4 to a nozzle formation surface 41*b* on which the nozzles of the first head 41 are formed. With this configuration, in particular, the mist of the reaction liquid can selectively be sucked, and the bottom portion 310*f* is less likely to contact with the printing medium P.

Figure 17:
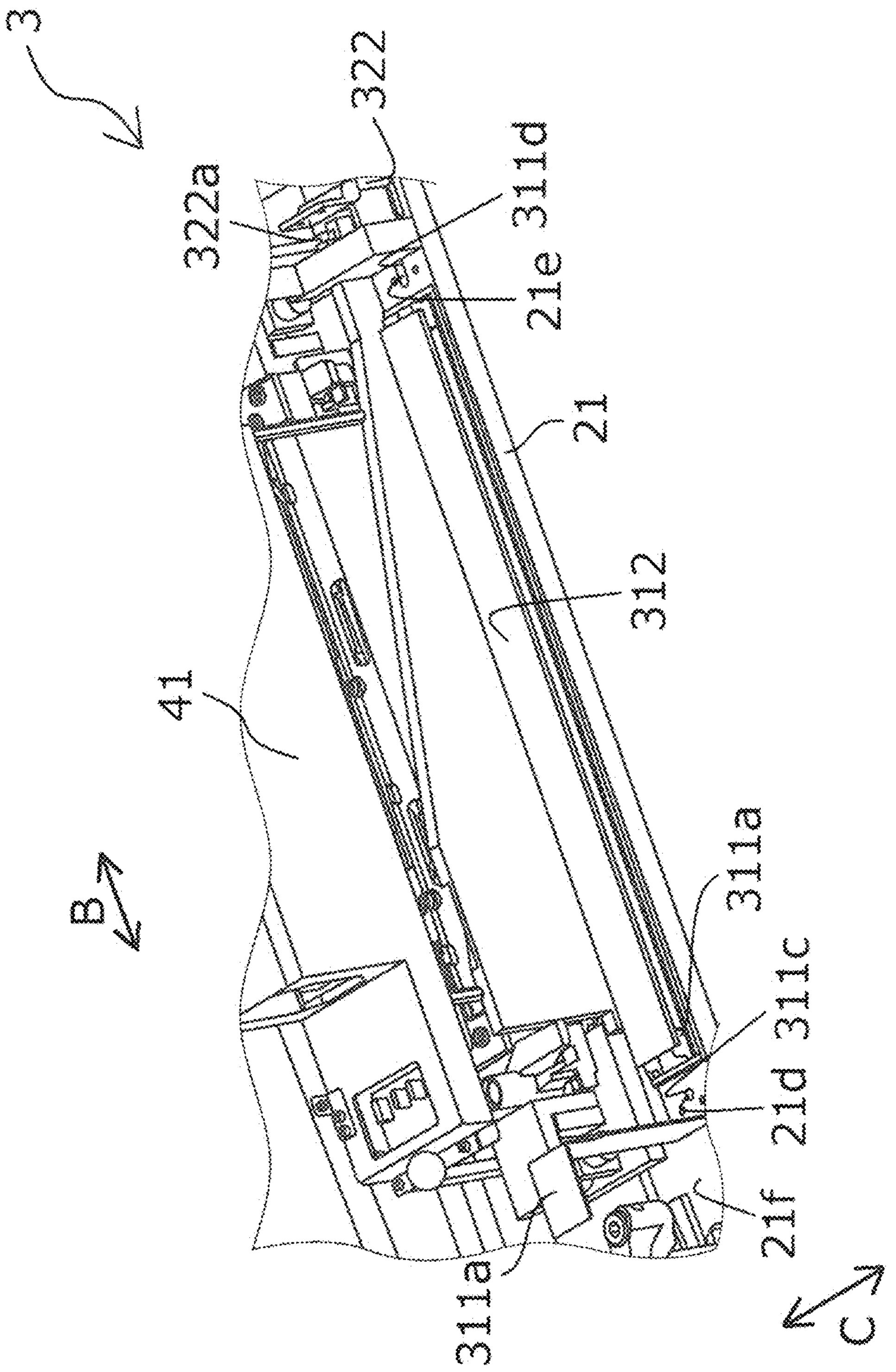
FIG. 17 is a perspective view illustrating a positioning configuration of the suction unit on the carriage of the printing apparatus in FIG. 1.

As illustrated in FIG. 17, the head holding plate 21 includes engaging portions 21*d* and 21*e* on a plate-like member facing surface 21*f* that faces the plate-like member 311. As illustrated in FIG. 17, the plate-like member 311 includes an engaged portion 311*c* with which the engaging portion 21*d* is engaged and an engaged portion 311*d* with which the engaging portion 21*e* is engaged when the attaching/detaching unit 31 is at the position of being pressed by the pressing unit 32 at the fixed position. The printing apparatus 1 of the present embodiment is thus configured. Therefore, the engaged portions 311*c* and 311*d* of the plate-like member 311 are engaged with the engaging portions 21*d* and 21*e* of the head holding plate 21, and thus the suction unit 30 can be positioned suitably with respect to the carriage 20.

In the printing apparatus 1 of the present embodiment, the engaging portion 21*d* is a projection portion having a circular shape in plan view, and the engaging portion 21*e* is a projection portion having an oblong shape in plan view. Further, the engaged portion 311*c* is a hole portion having a circular shape in plan view, into which the engaging portion 21*d* can be fitted, and the engaged portion 311*d* is a notch portion having a groove shape in plan view, into which the engaging portion 21*e* can be fitted. However, the present disclosure is not limited to such a configuration. For example, the engaged portion may be a projection portion, and the engaging portion may be a recessed portion into which the projection portion can be fitted.

The present disclosure is not limited to the above-described embodiments, and can be realized in various configurations without departing from the spirit of the present disclosure. For example, in order to solve the problem described above in whole or in part, or in order to achieve the effects described above in whole or in part, the technical characteristics in the embodiments that correspond to the technical characteristics in each mode described in the outline of the disclosure can be replaced or combined as necessary. Further, when the technical characteristics are not described as being essential in the present specification, the technical characteristics can be deleted as appropriate.

What is claimed is:

1. A printing apparatus comprising:
a printing medium holding unit configured to hold a printing medium;
a first head including:
a carriage configured to reciprocate in a scanning direction in a region facing the printing medium holding unit; and
a first nozzle row being provided to the carriage, the first nozzle row in which a plurality of nozzles for ejecting a first liquid are arrayed in an intersecting direction intersecting with the scanning direction; and
a suction unit being provided to the carriage and including a suction port configured to suck mist of the first liquid generated at the time of ejecting the first liquid from the first head, wherein
the carriage includes a head holding plate configured to hold the first head and the suction unit while facing the printing medium holding unit,
the head holding plate includes a first opening portion from which the first nozzle row is exposed and a second opening portion from which the suction port is exposed,
the suction unit includes a suction nozzle provided with the suction port, and
the suction nozzle is attachable to and detachable from the head holding plate.

2. A printing apparatus according to claim 1, wherein
the suction unit includes:
an attaching/detaching unit to which the suction nozzle is provided; and
a pressing unit configured to be fixed to the head holding plate and be displaced between a fixed position for fixing the attaching/detaching unit to the head holding plate and an attachable/detachable position for attaching or detaching the attaching/detaching unit with respect to the head holding plate.

3. A printing apparatus according to claim 2, wherein
the pressing unit includes a flow path for an airflow through which the mist is sucked and an airflow generation portion that generates the airflow.

4. A printing apparatus according to claim 3, wherein
the suction unit includes a filter configured to collect the mist sucked through the suction port,
the attaching/detaching unit includes:
a plate-like member having the scanning direction as a short direction and the intersecting direction as a longitudinal direction; and
a filter supporting portion that is provided to the plate-like member and supports the filter so that the flow path for the airflow is blocked by the filter,
the pressing unit includes a filter clamping portion, and
when the pressing unit is at the fixed position, the filter is clamped between the filter supporting portion and the filter clamping portion.

5. A printing apparatus according to claim 4, wherein
the plate-like member includes a recessed portion being recessed in a first direction from a second surface side to a first surface side, the first surface facing the head holding plate when the attaching/detaching unit is at a position being pressed by the pressing unit at the fixed position, the second surface being opposite to the first surface, facing the filter, and extending in the longitudinal direction, and the recessed portion functions as a part of the flow path for the airflow and the suction nozzle.

6. A printing apparatus according to claim 5, comprising:

a second head being provided to the carriage and including a second nozzle row in which a plurality of nozzles for ejecting a second liquid are arrayed in the intersecting direction, wherein the head holding plate includes a third opening portion from which the second nozzle row is exposed, the suction unit is provided between the first head and the second head in the scanning direction, the suction nozzle includes, as side walls provided from the second surface side to the first surface side, a first side wall positioned on the first head side in the scanning direction and a second side wall positioned on the second head in the scanning direction, the suction port is formed in the suction nozzle, a first end portion of the first side wall in the first direction forms a part of a contour of the suction port, and the first end portion does not protrude from the second opening portion to the printing medium holding unit side, and a second end portion of the second side wall in the first direction protrudes from the second opening portion to the printing medium holding unit side.

7. A printing apparatus according to claim 6, wherein the second liquid is ink containing a color material, and the first liquid is a reaction liquid that reacts with the color material.

8. A printing apparatus according to claim 6, wherein the suction nozzle includes a bottom portion being continuous with the second end portion and extending to the first head side, a length of the bottom portion in the scanning direction is smaller than a length between the first side wall and the second side wall in the scanning direction, and an end portion of the bottom portion on the first head side in the scanning direction forms a part of a contour of the suction port.

9. A printing apparatus according to claim 8, wherein a distance from the printing medium holding unit to the bottom portion is larger than a distance from the printing medium holding unit to a nozzle formation surface at which the nozzles of the first head are formed.

10. A printing apparatus according to claim 4, wherein the head holding plate includes an engaging portion on a plate-like member facing surface that faces the plate-like member, and the plate-like member is provided with an engaged portion that is engaged with the engaging portion when the attaching/detaching unit is at a position where the attaching/detaching unit is pressed by the pressing unit at the fixed position.

* * * * *